Dec. 13, 1955     J. L. D. MORRISON     2,726,467
ADVERTISING DISPLAYS
Filed June 5, 1951     3 Sheets-Sheet 2
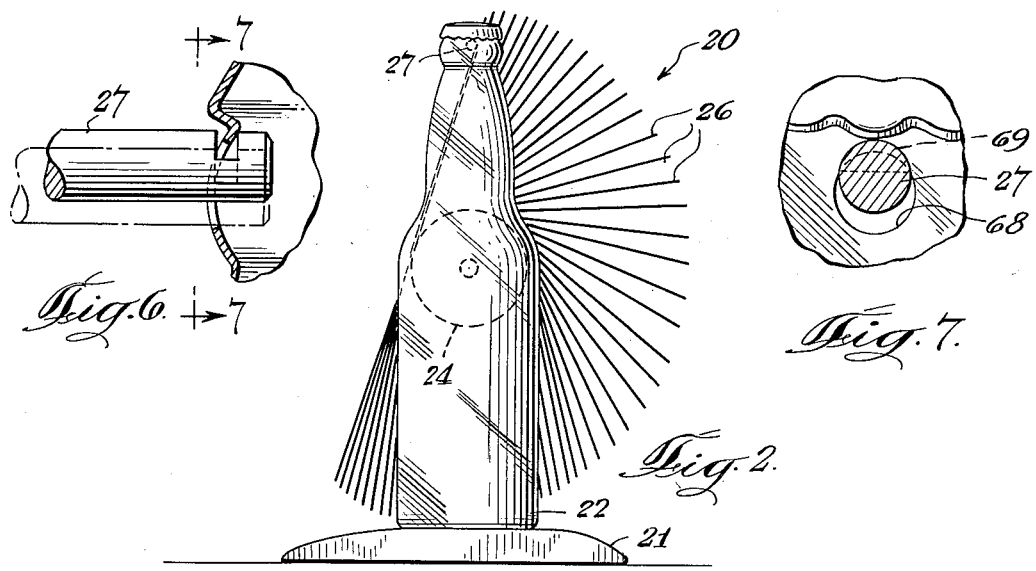
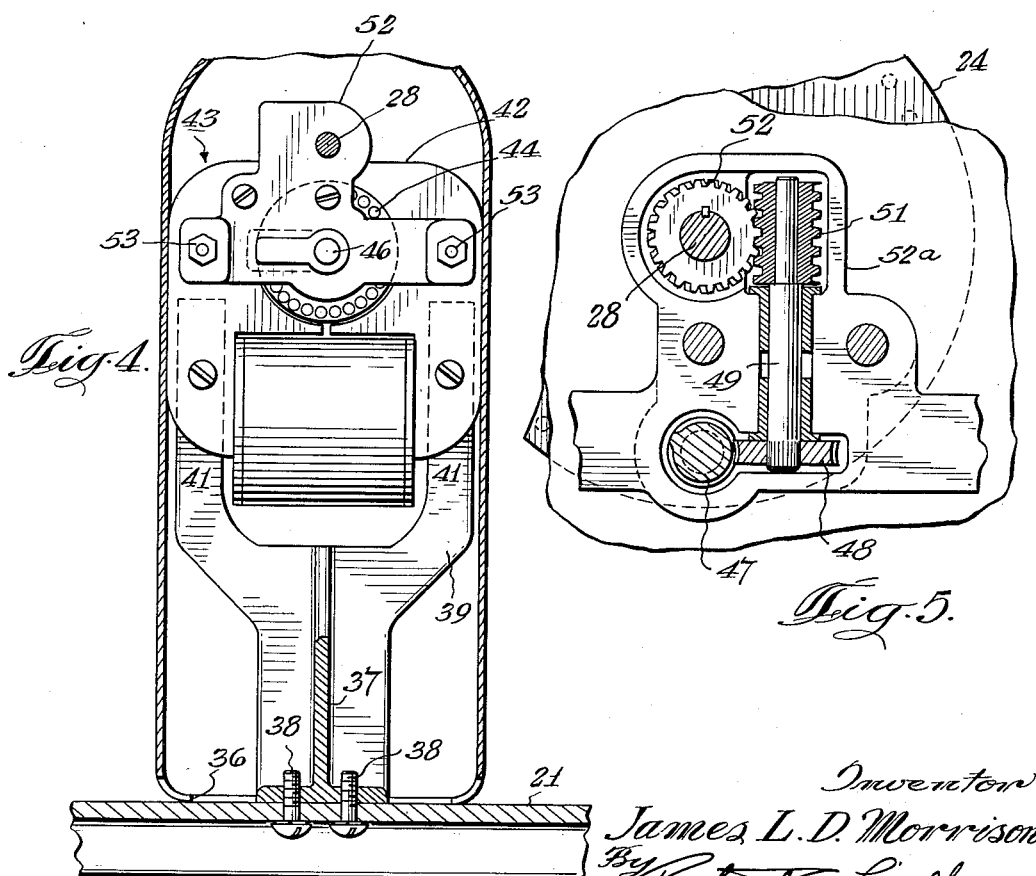
Inventor
James L. D. Morrison
By Richard C. Lindberg
Attorney Dec. 13, 1955  J. L. D. MORRISON  2,726,467
ADVERTISING DISPLAYS
Filed June 5, 1951  3 Sheets-Sheet 3
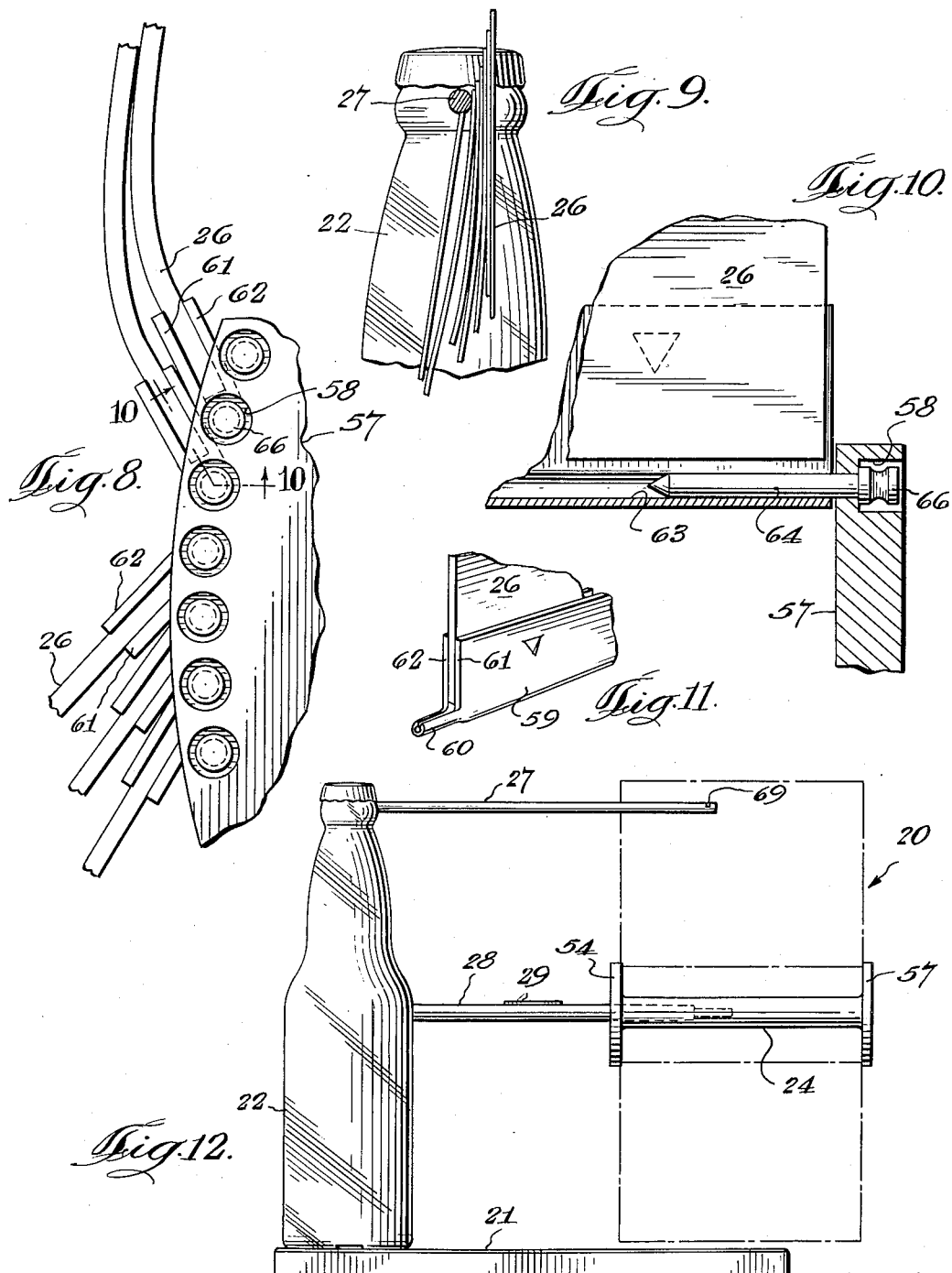
Inventor
James L. D. Morrison
By Richard C. Lindberg
Attorney

United States Patent Office 2,726,467
Patented Dec. 13, 1955

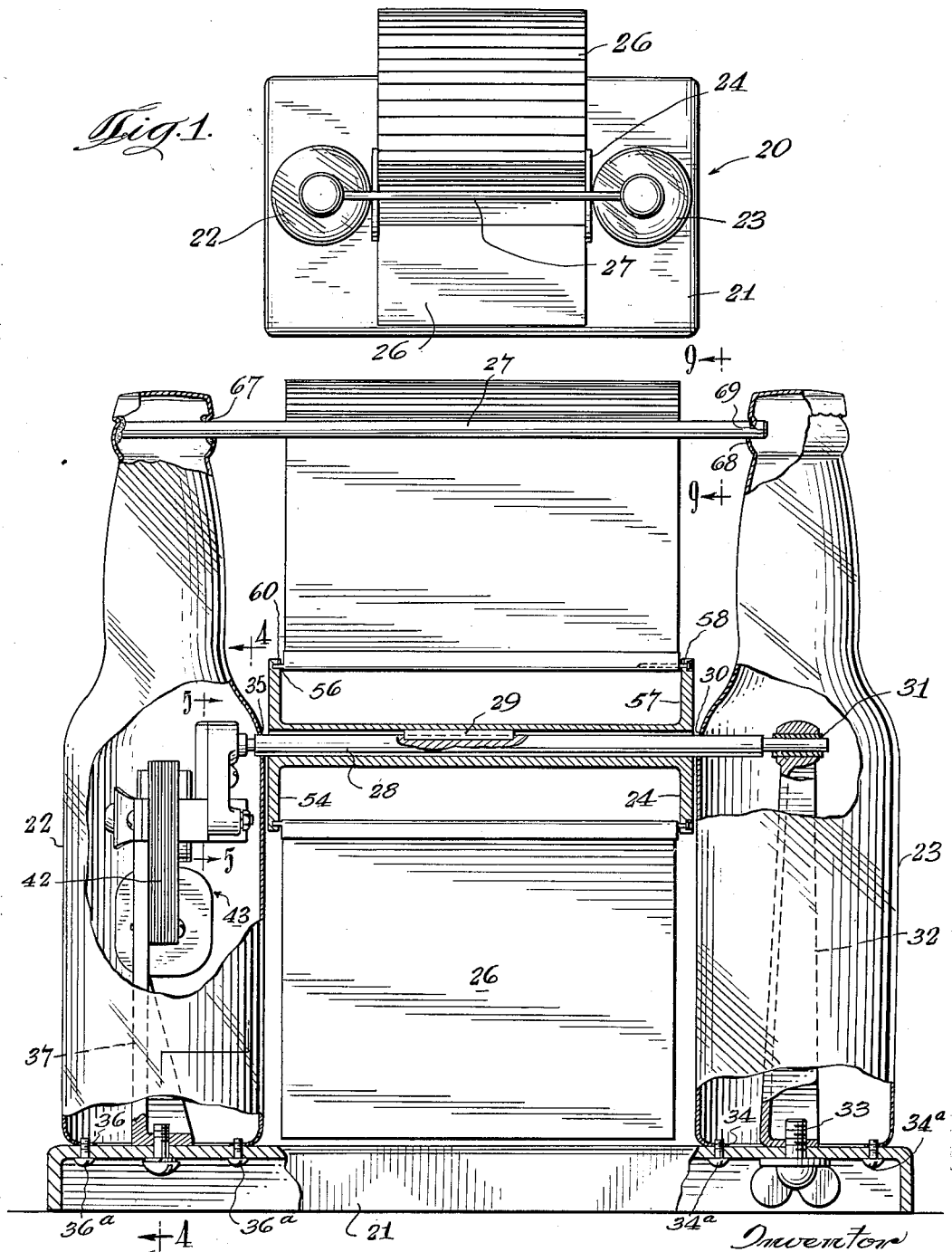

2,726,467
ADVERTISING DISPLAYS
James L. D. Morrison, Benton Harbor, Mich.

Application June 5, 1951, Serial No. 229,985

1 Claim. (Cl. 40—35)

This invention relates generally to advertising display devices and more particularly to a display device adapted to provide animation effects.

The advertising display device according to the present invention is characterized, in general, by a number of sequentially arranged frames arranged to turn with a rotating hub, the sequentially arranged frames being adapted to move against a stop so that the front face of the foremost frame is held in position momentarily before being speedily removed from view to the observer by the continuing rotation of the hub. The several frames may be in the form of photographs made preferably from a motion picture film negative strip, the individual negatives being cut at definite intervals from the strip so that the motion effect achieved by the rotation and stopping of the individual photograph frames made from the negatives will be substantially free from jerkiness. After the foremost frame is freed from engagement by the stop by the continuing rotation of the hub, the frame moves pivotally with respect to the hub to hang pendently from the hub thereby presenting the back face of the frame to the viewer. The back face of each frame preferably is provided with suitable advertising media so that the attention of the viewer to the animation sequence is concomitant with the advertising.

In a preferred form of the invention the mechanism for achieving rotation of the hub and the animation effect described is housed within structures forming a salient part of the display device. These structures also form a support for the rotating hub carrying the sequentially arranged frames and for a horizontally disposed stop bar serving to arrest the foremost frame momentarily.

With the foregoing considerations in mind it is a principal object of the invention to provide an animated display device in which a desired animation effect is achieved by a simple arrangement for stopping a frame of an animation sequence.

Another object is to provide an animated display device in which the mechanism for achieving the animation effect is completely housed within structures forming an integral part of the display.

Yet another object comprehends the provision of a hub rotating about an horizontal axis and forming a support for a sequence of frames spaced evenly about the periphery of the hub, and pivotally connected at the periphery thereof, and a stop bar cooperating with the frames for arresting a foremost frame momentrily for observation by a viewer before pivotal movement of said frame with respect to the hub to a pendent position for viewing of advertising media carried on the reverse side of said frame and successive frames of the sequence.

Other objects and important features of the invention will be apparent from a study of the within specification taken with the drawings showing the several views of the invention herein, which together show a preferred embodiment of the invention and what is now considered to be the best mode of practicing the principles thereof. Other forms of the invention will be suggested to those having the benefit of the teachings herein, and the scope of the invention is therefore not intended to be limited by the precise form shown herein, nor otherwise than by the spirit and scope of the subjoined claim.

In the drawings:

Fig. 1 is a top view on a reduced scale of an animated display device according to the present invention;

Fig. 2 is an end view thereof;

Fig. 3 is a front elevation view, parts thereof being shown in broken away section, on a larger scale as compared with Figs. 1 and 2, of the animated display device according to the present invention;

Fig. 4 is a section taken on the line 4—4 of Fig. 3 looking in the direction of the arrows and showing certain details of the driving mechanism;

Fig. 5 is an enlarged section taken along the line 5—5 of Fig. 3 looking in the direction of the arrows and showing details of a speed reducing mechanism for driving the animation sequences;

Fig. 6 is an enlarged detail view of the manner in which one end of the stop bar is held in position;

Fig. 7 is a section taken along the line 7—7 of Fig. 6;

Fig. 8 is an enlarged fragmentary end view of the support hub showing the even spacing of the sequence frames along the periphery thereof;

Fig. 9 is a fragmentary end view looking in the direction of the arrows 9—9 of Fig. 3 showing the sequence frames being held in position by the stop bar;

Fig. 10 is a section taken along the line 10—10 of Fig. 8 looking in the direction of the arrows showing the manner of holding a sequence frame in position on the rotating hub;

Fig. 11 is a detail perspective view of one end of a pressure clip for holding a sequence frame and a journal formed as a part thereof to be held in the support hub; and Fig. 12 is a partial front elevation view to the same scale as Figs. 1 and 2 showing the manner of assembling the display device according to the present invention.

The general organization of the animated advertising display according to the present invention is shown with particular reference to Figs. 1 and 2 of the drawings. The display device is referred to generally by reference numeral 20 and includes a base 21 for a pair of spaced standards 22 and 23 which in turn form a support for a rotating hub 24 having a number of evenly spaced frames 26 of an animation sequence, each frame 26 being pivotally connected at its ends to the hub 24. The frames 26 of the animation sequence are arranged to turn with the rotating hub 24 and to move against a stop bar 27 spanning the distance between the spaced standards 22 and 23, the foremost frame of the sequence being arrested in position momentarily by the stop bar 27, and the continuing rotation of the hub 24 drawing the foremost frame 26 slightly downward so that it is no longer held in such momentary position by the stop bar 27, and so that it is free to pivot rapidly about the hub 24 to hand pendently therefrom with the back face thereof presented to view, the next frame then being foremost in momentarily arrested position with its front face presented to view, the operation described being continued and the animation sequence being repeated as desired.

Each frame 26 of the animation sequence may be one of a group of photographs, and the sequence may be endless by arranging the frames so that there is no break marking the beginning and end of the sequence. If desired, however, the frames may be so arranged that the sequence has a beginning and an end.

The standards 22 and 23 form a salient part of the display device, and in the embodiment of the invention herein, are shown as a pair of simulated beverage containers of the crown-capped type. The standards 22 and 23 form a means of enclosing the driving and support mechanism for the hub 24 and the annimation frames 26. Referring now particularly to Figs. 3, 4 and 5 of the drawings, the hub 24 is made fast to a drive shaft 28 by a key 29. The drive shaft 28 extends through an aperture 30 formed in the hollow standard 23, and is supported at one end in a bearing 31 held in a bearing support 32 secured to the base 21 by a wing bolt 33. As seen in Fig. 3, the standard 23 has an opening 34 in the bottom thereof, so that the bearing support 32 may extend within the standard 23 and be wholly concealed thereby. The standard 23 may be held in position to the base 21 by cap screws 34a threaded thereinto.

The drive shaft 28 also extends through an aperture 35 formed in the hollow standard 22, and means are provided for supporting the opposite end of the shaft 28 and for driving same. To this end the standard 22 has an opening 36 in the bottom thereof so that a motor support 37 may extend thereinto. The standard 22 is held in position to the base 21 by screws 36a threaded into the bottom of the standard 22. As seen more particularly in Fig. 4, the support 37 is held in position on the base 21 by screws 38. The upper end of the support 37 terminates in a yoke 39 having spaced arms 41, 41. The field structure 42 of a shaded pole motor 43 is bolted to the arms 41, 41, and an armature 44 turns with a shaft 46 having a worm 47 fast thereto, see Fig. 5. The worm 47 is part of a double worm reduction train including a worm wheel 48 mounted on a shaft 49, a worm 51 fast to the shaft 49, and a wormwheel 52 meshing therewith and fast on the shaft 28. As seen in Figs. 3 and 5, the reduction train just described is contained within a housing 52a bolted to the motor field structure 42 as at 53.

The hub 24 has a circular end flange 54 which is bored at evenly spaced intervals near the periphery thereof to provide recesses 56 therearound. The hub 24 has an opposite end circular flange 57 which is bored and counterbored at evenly spaced intervals to provide pin receiving recesses 58. The recesses 56 and 58 are in alignment and the recesses 56 are adapted to receive a journal-like extension 60 of a clip 59 having arms 61 and 62 which are squeezed together to hold the frame 26 therebetween, see Fig. 11. The inside face of the arms 61 and 62 near their line of connection with the clip 59 also define a bearing surface 63 for a pin 64 having a head 66 inserted within the recess 58. The pin 64 has a press fit in the flange 57 to prevent it from working loose upon rotation of the hub 24. The fits of the journal-like extension 60 in the recess 56, and the fits of the pin 64 between the arms 61 and 62 are relatively loose so that the frame 26 may swivel readily with respect to the hub 24.

The stop bar 27 is supported at one end by the standard 22, there being an aperture 67 formed therein through which the stop bar 27 extends, the stop bar 27 being held in position by soldering, brazing or the like. The other end of the stop bar 27 extends through an aperture 68 in the standard 23. The bar 27 is formed with a slot 69, the sides of the slot 69 embracing the wall of the standard 23. The aperture 68 is large enough so that the bar 27 may freely pass therethrough, and in so doing is deflected from its normal position so that its resiliency will cause the slot to embrace the walls of the standard 23.

Referring now to Fig. 12 of the drawings, the mode of assembling the animated display device according to the present invention will now be described. The standard 22, motor 43, and the motor support 37 are first assembled with the drive shaft 28 and the stop bar 27 extending from the standard 22. The hub 24 is next assembled with the animation sequence frames 26 arranged in proper order thereon, and then keyed to the shaft 28. The standard 23 and the bearing support 32 are then placed in position with the free end of the shaft 28 supported in the bearing 31 within the hollow standard 23, the stop bar 27 at the same time being locked in position to the standard 23 by the notch 69. The support 32 is then secured to the base 38 by the wing bolt 33. The standards 22 and 23 are then held in position on the base 21 by the screws 36a and 34a respectively.

With the display device according to the present invention thus assembled, and power supplied to the motor 42 the rotation of the hub 24 will move the individual frames 26 of the sequence as more particularly seen in Fig. 2 until stopped by the stop bar 27. As seen in Figs. 8 and 9, the frames 26 have a certain amount of flexibility so that as the rotation of the hub 24 carries the foremost frame under and past the stop bar 27, the foremost frame of the sequence will be given a flipping action to pivot forward about the hub 24 until the frame 26 hangs pendently between the standards 22 and 23 with the back face thereof presented to the viewer.

The display device according to the present invention provides a continuous animation effect to the viewer, while at the same time providing a means for providing any desired advertising message. The standards housing the motor drive mechanism may be altered as desired, and may be in the form of the product being advertised, for example cartons for chewing gum or cigarettes, or a wide variety of sizes and shapes of beverage containers. It is intended, therefore, that the scope of the invention not be limited by the precise form of display device as shown herein, nor the precise form of support for the sequence frames and the means for rotating said sequence frames, and it is intended that the scope of the invention be limited only as defined by the scope and breadth of the claim here appended.

I claim:

In a device for displaying an animation sequence consisting of individual frames each bearing intelligence, a pair of spaced stationary standards of a configuration in accordance with a product being advertised, a shaft having a hub thereon spanning the distance between said spaced stationary standards, said hub including means for supporting said individual frames for rotation therewith about the axis of said shaft and for pivotal movement of said frames with respect to said hub, driving mechanism enclosed within one of said stationary hollow standards and drivably connected with one end of said shaft, a support for the other end of said shaft contained within the other of said stationary hollow standards, and a stop bar supported by said stationary hollow standards near the top portions thereof, said stop bar extending horizontally in a position spaced from and above said hub, said stop bar having one end held by the stationary hollow standard enclosing said driving mechanism and having its other end provided with a notch engaging the wall of said other stationary hollow standard, said other hollow standard having an aperture therein for insertion of said stop bar, said aperture being so related to said stop bar as to enable said stop bar to be flexed before engagement by said notch of the wall of said other stationary standard, so as to hold stop bar in position spanning said stationary standards, said stop bar in such last named position being adapted to arrest part of said pivotally supported frames in a substantially vertical position against each other and restrained by said stop bar, the foremost arrested frame being adapted to be viewed whilst in such position, the continuing rotation of said hub withdrawing said foremost frame from engagement by said stop bar for movement pivotally of said foremost frame with respect to said hub to a pendent position for viewing of a succeeding frame.

References Cited in the file of this patent

UNITED STATES PATENTS

| 1,006,188 | Edson | Oct. 17, 1911 |
| 1,120,503 | Jaqua | Dec. 8, 1914 |
| 1,330,134 | Page | Feb. 10, 1920 |
| 2,143,143 | Dobrowsky | Jan. 10, 1939 |
| 2,554,941 | Dobrowsky | May 29, 1951 |